United States Patent [19]
Tomka

[11] Patent Number: 5,663,216
[45] Date of Patent: Sep. 2, 1997

[54] REINFORCED BIODEGRADABLE POLYMER

[75] Inventor: Ivan Tomka, Bourguillon, Switzerland

[73] Assignee: Bio-Tec Biologische Naturverpackungen GmbH, Germany

[21] Appl. No.: 586,862

[22] PCT Filed: Jul. 14, 1994

[86] PCT No.: PCT/EP94/02321

§ 371 Date: Jan. 26, 1996

§ 102(e) Date: Jan. 26, 1996

[87] PCT Pub. No.: WO95/04106

PCT Pub. Date: Feb. 9, 1995

[30] Foreign Application Priority Data

Jul. 28, 1993 [CH] Switzerland .......................... 02 281/93

[51] Int. Cl.⁶ ................... C08L 3/02; C08L 1/02; C08L 1/26
[52] U.S. Cl. ................... 523/128; 524/13; 524/34; 524/35; 524/47; 106/162.51
[58] Field of Search ............... 106/163.1, 204, 106/210, 214; 524/9, 13, 14, 15, 16, 47, 34, 35; 523/128

[56] References Cited

U.S. PATENT DOCUMENTS 5,317,037  5/1994  Golden et al. .......................... 106/214

FOREIGN PATENT DOCUMENTS

| 0319589 | 6/1989 | European Pat. Off. . |
| 0535994 | 4/1993 | European Pat. Off. . |
| 0551954 | 7/1993 | European Pat. Off. . |
| 0587078 | 3/1994 | European Pat. Off. . |
| 9210246 | 6/1992 | WIPO . |

OTHER PUBLICATIONS

Chemical Abstracts, vol. 119, No. 181893.

*Primary Examiner*—Peter A. Szekely
*Attorney, Agent, or Firm*—Ostrolenk, Faber, Gerb & Soffen, LLP

[57] ABSTRACT

In order that a substantially biologically degradable polymer is prevented from at least partially losing its biological degradability when reinforced by additives such as fibers and the like, it is proposed that natural fibers such as, in particular, sisal or ramie fibers, be used.

13 Claims, No Drawings

REINFORCED BIODEGRADABLE POLYMER

The present invention relates to a reinforced substantially biologically degradable polymer as well as a process for its production.

Biologically degradable polymers such as starch, gelatin, cellulose derivatives, etc., or mixtures thereof are in the course of establishing themselves as polymer materials in addition to the known plastics, although, to be sure, at present only for very specific uses such as the encapsulating of active principles such as drugs, as packaging materials or packaging aids without special mechanical demands, as dish ware, cups, and the like. Their use for technical purposes as so-called "engineering plastics" is greatly limited due to their relatively poor mechanical properties such as compressive and tensile strength, as compared with the known plastics.

One possibility for improving these properties consists in reinforcing biologically degradable polymers, a technique which is already known from the use of plastics. As reinforcing materials, glass fibers or beads stand, in particular, in the foreground, and recently also carbon fibers and aramid fibers have been used. These reinforcing agents, however, are not biologically degradable; on the contrary, they are extremely resistant to natural degradation processes.

It is therefore an object of the present invention to propose a solution for improving the mechanical properties of biologically degradable polymers.

Another object of the present invention is to propose a biologically degradable polymer which is suitable for use as so-called engineering plastic.

In accordance with the invention, a reinforced, substantially biologically degradable polymer characterized by thermoplastic starch or a polymer mixture containing thermoplastic starch and at least one hydrophobic biologically degradable polymer, reinforced by natural fiber which are incorporated in the polymer is provided.

In accordance with the invention, it is proposed to reinforce a substantially biologically degradable polymer by natural fibers which are incorporated in a suitable biologically degradable polymer in accordance with the methods generally customary in plastics engineering. The natural fibers can be one of the following: ramie, cotton, jute, hemp, sisal, flax, linen, silk, abaca and/or mixtures thereof.

Sisal and ramie fibers are particularly suitable. In the case of sisal, concerned are flexible leaf fibers from leaves of a length of up to 2 meters of the sisal agave native to Central America. These hard fibers, at times referred to also as "sisal hemp", are used, for example, for the production of ships' hawsers, ropes, brushes, etc. Ramie fibers, also known by the name of China grass fibers, are obtained from the ramie plant, which comes originally from China, Japan, and Southeast Asia. About 85% of the raw ramie production of a total of about 100,000 tons of raw fibers still comes today from China. The high polymer chemical structure and the special microstructure impart to the ramie fiber dynamic loadability and an extremely high tear strength in dry as well as in wet state. Under tensile load, the ramie fiber shows very little elongation as compared, for instance, with glass, metal, carbon or aramid fibers.

Due to the properties described, sisal fibers and ramie fibers are particularly suitable as reinforcement, so that it has already been proposed in the past to combine, for instance, ramie fibers with metal, aramid and carbon fibers in plaster, cement and epoxy resins. However, because of their high price—ramie fibers cost about twice as much as cotton fibers—ramie fibers have not been able to establish themselves as reinforcement.

In connection, however, with biologically degradable polymers, natural fibers, such as, in particular, sisal and ramie fibers, afford an excellent possibility for decisively improving the mechanical properties of such polymers, without, however, negatively affecting the biologically degradability of said polymers. Even more, sisal and ramie fibers represent a natural replenishing resource so that they supply, in combination with starch, cellulose, or other polymers developed of naturally self-replenishing sources, reinforced polymers, which are thus completely based on natural resources. Of course, however, sisal and ramie fibers also are suitable for the reinforcing of synthetic biologically degradable polymers such as, for instance, cellulose derivatives such as cellulose ether, and cellulose ester or cellulose co-esters as well as aliphatic polyesters such as polycaprolactone, polyhydroxybutyric acid, etc., as well as hydrophobic proteins such as zein and polyvinyl alcohols, which can be produced by non-one-hundred-per-cent hydrolyzation of polyvinyl acetate.

Finally, of course, synthetic polymers such as polyamide, polyester, polypropylene, etc., can also be reinforced with, for instance, sisal and ramie fibers; however, since biological degradability is not important in the case of said plastics, these natural fibers are thus in direct competition with other reinforcing agents such as, for instance, glass fibers, carbon fibers and the like, where finally only price is the decisive factor.

In accordance with the invention, it is proposed to incorporate 5 to 30% of natural fibers in a biologically degradable polymer. Of course, it is possible to incorporate also larger proportions of natural fibers in polymers, but this results, on the one hand, in problems in connection with the incorporating of the fibers into the polymer as a result of very high shearing forces, while, on the other hand, as from a certain point, an increase in tensile strength and elongation upon rupture are obtained only at the expense of, for instance, increased brittleness.

There has proven particularly advantageous a reinforced biologically degradable polymer containing thermoplastic starch or a polymer blend containing thermoplastic starch and at least one other hydrophobic biologically degradable polymer. Of course, it is also possible to reinforce, for instance, disaggregated starch by means of ramie fibers, but since so-called high-grade engineering plastics are produced by reinforcement with, for instance, sisal or ramie fibers, it is of course advantageous to optimize also the basic starch polymer. In this connection, reference may be had to international patent application W 90/05161, as well as to other publications such as "Sorption Behavior of Native and Thermoplastic Starch" by R. M. Sala and I. A. Tomka, in Die angewandte makromolekuläre Chemie 199:45–63, 1992; as well as ETH Dissertation No. 9917 of R. M. Sala, Zurich 1992, ETH Zurich.

In this connection, one can start for instance from a thermoplastic starch which contains at least one of the following plasticizing agents or swelling agents:

sorbitol, glycerol, pentaerythritol, trimethylol propane, a polyvinyl alcohol, an ethoxylated polyalcohol or mixtures of these components. Of course, the thermoplastic starch can also be digested by another swelling or plasticizing agent which is suitable for the production thereof. In contradistinction to disaggregated starch, it is important that the thermoplastic starch has not been digested with water.

In case of the use of a polymer blend comprising thermoplastic starch for reinforcement by, for instance, ramie fibers, the above-indicated hydrophobic biologically degradable polymers are particularly suited, which polymers, in their turn, can, as sole polymer components, be reinforced by ramie fibers. There are concerned here cellulose derivatives having a degree of substitution less than or equal to 2, such as cellulose ether, cellulose ester, or cellulose co-ester;

aliphatic polyesters such as polycaprolactone, polyhydroxybutyric acid, polyhydroxy-butyric acid/hydroxy-valeric acid copolymers and polylactic acid; as well as hydrophobic proteins, such as, for instance, zein; and/or polyvinyl alcohol prepared by a non-one-hundred-percent hydrolyzation of polyvinyl acetate, preferably with a degree of hydrolyzation of about 88%.

As example of a cellulose ether, mention may be made of cellulose diethyl ether (CDE), which can be processed thermoplastically at 190° C., for instance with diethyl tartarate as plasticizer and which are biologically degradable. The maximum water absorption at 20° C. in water is only just 0.04 parts by weight.

As example of cellulose esters, mention may be made of cellulose diacetate (CDA) or, as co-ester, cellulose acetate butyrate, which can be processed thermoplastically with plasticizers at 180° C. and which are biologically degradable. The maximum water absorption at 20° C. in water is only just 0.05 parts by weight.

Polycaprolactone can be processed without plasticizer at 120° C.; it is partially crystalline, with a melting point of between 60° C. and 80° C. and a vitreous solidification at −50° C. Its mechanical properties are comparable to those of low—density polyethylene. The maximum water absorption at 20° C. is less than 0.01 parts by weight and furthermore polycaprolactone is biologically degradable. One great advantage of the use of polycaprolactone is that it is readily miscible with thermoplastic starch without the necessity of using a so-called phase mediator.

Polyhydroxybutyric acid/polyhydroxy-valeric acid— copolymers can be processed thermoplastically, and have good mechanical properties and a low water absorption of less than 0.01 parts by weight, and they are furthermore biologically degradable. The same is true of polylactic acid which, although it can be readily processed thermoplastically, has good mechanical properties and is biologically degradable.

Zein, for instance, is proposed as hydrophobic protein, it being capable of being thermoplastically processed with 0.2 parts by weight of lauric acid or diethyl tartrate at 130° C.

Finally, mention should also be made of polyvinyl alcohol, known for instance under the brand name Moviol, in which connection the polyvinyl acetate used for its production is preferably 88% hydrolyzed.

A phase mediator which is compatible both with the thermoplastically processable starch and at the same time with the hydrophobic polymer is preferably used in such a polymer mixture. Due to the different cohesion energy densities of starch and the hydrophobic polymers, block copolymers generally enter into question, namely ones which consist of a block soluble in starch and of a block soluble in the hydrophobic polymer phase. It is, of course, essential in this connection for the phase mediator also to be biologically degradable and can be properly processed thermoplastically. As an example thereof, a polycaprolactone/polyvinyl alcohol copolymer may be mentioned.

As phase mediator, however, there also enter into consideration reaction products between a hydrophobic biologically degradable polymer and the thermoplastic starch which are compatible with the hydrophobic polymer phase. In this connection, for instance, the biologically degradable polymer can, for instance, have reactive groups such as, for instance, epoxy groups or else acid anhydride groups which react with at least a part of the thermoplastic starch.

The phase mediator to be used and the quantity thereof to be employed are, finally, a question of optimalization; it is essential that the polymer mixture to be used for the production of a foam be as uniform and homogeneous as possible in order to be able to produce a foam which is also as uniform as possible.

Before the incorporating of the natural fibers, such as, for instance, ramie fibers, into the biologically degradable polymer, the fibers are preferably degummed by removal of pectins and hemicellulose by known combinations of biochemical and chemical methods with which manufacturers of ramie fibers are well acquainted. Previously, natural fibers were, as a rule, boiled in alkali solutions.

For the incorporation, natural fibers, for instance ramie fibers, having a fiber length of 0.08 to 5 mm are used. The incorporation is effected in polymer mixing units customary in plastics engineering, such as single-shaft or twin-shaft extruders or kneaders, in which connection, of course, the working can also take place batchwise in suitable mixers. It is essential, upon the incorporating of ramie fibers into the biologically degradable polymer, that the mechanical energy introduced as well as the temperature is so selected that no degradation of the biologically degradable polymer takes place. In particular, when using thermoplastic starch, it is important that a temperature which is clearly less than 200° C. be maintained in an extruder since, otherwise, the starch is strongly degraded. The further processing of the reinforced plastics is less critical and can be carried out in, for instance, the case of thermoplastic starch within a temperature range of 180° C. to 210° C.

Upon the production of the reinforced polymers, other additives and addition substances can be used, such as generally customary in the plastics processing industry, namely lubricants, mold removal aids, flame-retarding additives, coloring substances, etc.

In order to control the mechanical properties of moldings produced with reinforced biologically degradable polymers produced in accordance with the invention, it is also possible to use further biologically degradable or natural fibers such as cotton, in addition to the sisal or ramie fibers proposed by way of example in accordance with the invention. By the mixing, for instance, of the ramie fibers with cotton, it is possible to impart flexibility to moldings produced with the polymers proposed in accordance with the invention. Finally, what natural fibers such as, for instance cotton, hemp, jute, sisal, etc. are mixed with the sisal or ramie fibers, is a question of what is most optimal.

Another advantage of the incorporating of the ramie fibers for instance into biologically degradable polymers is that the water resistance of the polymer is increased. In particular, when using natural polymers such as starch and cellulose which as a rule are hydrophilic, this may be an important advantage.

Another possibility of incorporating natural fibers such as sisal or ramie fibers consists therein that, due to the ability of, for instance, the ramie fibers to bind moisture in capillary-active manner, a certain amount of moisture can be incorporated latently in a polymer which in itself has been dried. At a later time, this polymer can then be processed at elevated temperature and elevated pressure, at which time the moisture bound in the ramie fiber is liberated so as to effect the foaming of the polymer. Particularly when employed in thermoplastic starch, this is an extremely interesting use since, as already described above, water as expansion agent can be introduced by the incorporating of ramie fibers into the thermoplastic starch which it is advantageous to process dry, the water being later liberated so as to produce the foam. In this connection, it has also been found that by means of this technique for the production of the foam, one can operate with an extremely small proportion of expansion agent or water and that a very uniform light foam having good mechanical properties can be produced. As compared with this, the starch foam produced in the prior art by means of water has an extremely irregular cell structure.

The invention will now be explained in further detail with reference to examples and series of tests.

EXAMPLE 1

One starts from thermoplastic starch which has been prepared by digesting 65% starch with 35% sorbitol. The operation is carried out in a Theysohn TSK 045 compounder (twin-shaft extruder with shafts rotating in the same direction) with different liquid/solid ratios. The following temperature profile is selected in the extruder:

Zone 1, 25° C.; Zone 2, 130° C.; Zone 3, 150° C.; Zone 4, 170° C.; Zone 5, 150° C.; Zone 6, 140° C.; Zone 7, 140° C.; Zone 8, 170° C.

10 kg/hr of thermoplastic starch granulates are introduced into Zone 1 and melted. In Zone 5, 1500 g/hr of thermoplastic starch, 840 g/hr of ramie fibers having a fiber length of 0.5 mm, and 200 g/hr of stearic acid are furthermore added. The ramie fiber had been pretreated by moistening or substantially saturating with water before its admixture. This was followed by mixing and the removal of the melt and cooling. It should be seen to it in this connection that the material does not foam already upon the compounding, which can be obtained by temperatures which are definitely below 200° C. The following extruder values were selected:

Speed of rotation of extruder: 200 rpm
Torque: 65% of the maximum torque
Mass pressure (die): 4–8 bar As an alternative to the procedure used in Example 1, one can also start from native starch, in which case the thermoplastic starch is first of all digested by the addition of sorbitol. It should be seen to it in this connection that any moisture present in the native starch is removed by the application of a vacuum. It is essential that the thermoplastic starch have only a low moisture content upon the processing or the incorporating and compounding with the ramie fiber, i.e. that the moisture content is preferably less than 1% by weight.

EXAMPLE 2

The same compounding unit is used as in Example 1. Again, 10 kg/hr of thermoplastic starch (containing 35 wt. % sorbitol) is added in Zone 1 and melted. In Zone 5, there then are added an additional 1500 g/hr of thermoplastic starch as well as 1200 g/hr of ramie fibers having a fiber length of 0.5 mm, as well as 200 g/hr of stearic acid.

Extruder values:
Speed of rotation of the extruder: 200 rpm
Torque: 80% of the maximum torque
Mass pressure (die): 4 bar
Temperature profile compounder:
Zone 1, 25° C.; Zone 2, 130° C.; Zone 3, 150C.; Zone 4, 170° C.; Zone 5, 130° C.; Zone 6, 120° C.; Zone 7, 120° C.; Zone 8, 160° C.

EXAMPLE 3

As basis in Example 3 there is used native starch which is added in Zone 1 of a similar compounding unit as that used in Examples 1 and 2. In Zone 1, 13.5 kg/hr of starch are added, and in Zone 2 10/kg/hr of sorbitol. This is followed by the digestion of the starch to form thermoplastic starch. The steam produced is drawn off by a vacuum in Zone 4. In Zone 5, 200 g/hr of finished thermoplastic starch as well as 1200 g/hr of ramie fibers having a fiber length of 1 mm as well as 200 g/hr of stearic acid are added. The melt thus produced is removed and granulated.

Extruder values:
Speed of rotation of the extruder: 200 rpm
Torque: 65% of the maximum torque
Mass pressure (die): 40 bar
Temperature profile compounder:
Zone 1, 80° C.; Zone 2, 160° C.; Zone 3 190° C.; Zone 4, 180° C.; Zone 5, 160° C.; Zone 6 140° C.; Zone 7, 140° C.; Zone 8, 170° C.

As the temperature profile clearly shows, temperatures of between 160° C. and 190° C. are established in Zones 2 to 4, which temperatures are necessary or preferred in order to digest thermoplastic starch. The temperatures are then reduced to 160° C. or less in order to prevent the emergence of the moisture from the capillaries of the ramie fibers.

Instead of sorbitol, one can, of course, also use pentaerythritol or glycerol or some other suitable plasticizer for the digesting of the thermoplastic starch. Depending on the viscosity of the starch/plasticizer mixture or the thermoplastic starch thus digested which is established, lower temperatures can be selected in Zone 4 and following zones for the incorporating of the ramie fibers.

EXAMPLE 4

All adjustments as in Example 3, only that in Zone 5, 400 g/hr of stearic acid are newly added rather than 200 g/hr.

Extruder values: 200 rpm
Speed of rotation of extruder: 60–65% of the
maximum torque
Mass pressure (die): 30–40 bar

EXAMPLE 5

13.5 kg/hr of starch are added in Zone 1 and 10 kg/hr of sorbitol in Zone 2. This is followed by digestion of the starch. Undesired water is removed in Zone 4. 200 g/hr of completely digested thermoplastic starch, 240 g/hr of ramie fibers of a fiber length of 2 mm, and 360 g/hr of a neutral fatty-acid ester as processing aid are added in Zone 5. The melt is withdrawn and granulated.

Extruder values:
Speed of rotation of extruder: 250 rpm
Torque: 55% of the maximum torque
Mass pressure (die):
Temperature profile of extruder:
Zone 1, 80° C.; Zone 2, 160° C.; Zone 3, 190° C.; Zone 4, 180° C.; Zone 5, 170° C.; Zone 6, 160° C.; Zone 7, 160° C.; Zone 8, 170° C.

EXAMPLE 6

The same procedure as in Example 5, only that 470 g/hr of processing aid is added in Zone 5 instead of 360 g/hr.

Extruder values:
Speed of rotation of extruder: 250 rpm
Torque: Lower value than Example 5
Mass pressure (die):

Temperature profile of extruder:

Zone 1, 80° C.; Zone 2, 160° C.; Zone 3, 190° C.; Zone 4, 180° C.; Zone 5, 150° C.; Zone 6, 135° C.; Zone 7, 135° C.; Zone 8, 135° C.

EXAMPLE 7

10 kg/hr of completely digested thermoplastic starch are added in Zone 1, and 160 g/hr of water are added as processing aid in Zone 2. The water is then removed in Zone 4. 2000 g/hr of completely digested thermoplastic starch as well as 2400 g/hr of ramie fibers of a fiber length of 2 mm, and 360 kg/hr of a neutral fatty-acid ester as processing aid are added in Zone 5. The melt is then withdrawn and granulated.

Extruder values:

Speed of rotation of extruder: 200 rpm

Torque: 65% of the maximum value

Mass pressure (die):

Temperature profile of extruder:

Zone 1, 40° C.; Zone 2, 130° C.; Zone 3, 155° C.; Zone 4, 170° C.; Zone 5, 150° C.; Zone 6, 140° C.; Zone 7, 140° C.; Zone 8, 170° C.

EXAMPLE 8

10 kg/hr of completely digested thermoplastic starch are added in Zone 1, and 160 g/hr of water as processing aid in Zone 2. The water is removed in Zone 4. 2000 g/hr of completely digested thermoplastic starch as well as 1200 g/hr of ramie fibers having a fiber length of 1 mm and 360 g/hr of a neutral fatty-acid ester as processing aid are added in Zone 5. Thereupon, the melt is withdrawn and granulated.

Extruder values:

Speed of rotation of extruder: 200 rpm

Torque: 50–55% of the maximum value

Mass pressure (die):

Temperature profile of extruder:

Zone 1, 25° C.; Zone 2, 130° C.; Zone 3, 155° C.; Zone 4, 170° C.; Zone 5, 150° C.; Zone 6, 140° C.; Zone 7, 140° C., Zone 8, 170° C.

EXAMPLE 9

Basis: Completely digested thermoplastic starch with 33% glycerol; fiber length 0.5 mm, water content of the fiber: 7%.

Temperature profile of compounder:

Zone 1, 100° C.; Zone 2, 180° C.; Zone 3, 180° C.; Zone 4, 150° C.; Zone 5, 120° C.; Zone 6, 120° C.; Zone 7, 120° C.; Zone 8, 170° C.

In Zone 1, 15 kg/hr of thermoplastic starch granulate are added and melted. In addition, 340 g/hr of ramie fibers are added in Zone 4, and 1500 g/hr of thermoplastic starch and 200 g/hr of stearic acid in Zone 5. This is followed by removal of the melt and cooling. It must be seen to it that the material does not foam already upon the compounding (temperature 200° C.).

Extruder values:

Speed of rotation of extruder: 150 rpm

Torque: 45% of the maximum torque

Mass pressure (die): 4 bar

EXAMPLE 10

Completely digested thermoplastic starch with 33% glycerol; fiber length 0.5 mm, water content of the fibers: 7%.

Temperature profile of compounder:

Zone 1, 100° C.; Zone 2, 180° C.; Zone 3, 180° C.; Zone 4, 150° C.; Zone 5, 120° C.; Zone 6, 120° C.; Zone 7, 120° C.; Zone 8, 170° C.

20 kg/hr of thermoplastic starch granulate are added in Zone 1 and melted. In addition, 670 g/hr of ramie fibers are added in Zone 4, and 2500 g/hr of thermoplastic starch and 200 g/hr of stearic acid in Zone 5. This is followed by removal of the melt and cooling. Temperatures of not more than 200° C. are used.

Extruder values:

Speed of rotation of extruder: 100 rpm

Torque: 55% of the maximum torque

Mass pressure (die): 10 bar

EXAMPLE 11

Completely digested thermoplastic starch with 33% glycerol; fiber length 0.5 mm, water content of the fibers: 7%.

Temperature profile of compounder:

Zone 1, 60° C.; Zone 2, 180° C.; Zone 3, 180° C.; Zone 4, 150° C.; Zone 5, 120° C.; Zone 6, 120° C.; Zone 7, 120° C.; Zone 8, 170° C.

20 kg/hr of thermoplastic starch are added in Zone 1. 1260 g/hr of ramie fibers are added in Zone 4, and 3000 g/hr of thermoplastic starch and 200 g/hr of stearic acid in Zone 5. Granulation.

Extruder values:

Speed of rotation of extruder: 200 rpm

Torque: 50% of the maximum torque

Mass pressure (die): 12 bar

EXAMPLE 12

Polymer blend, consisting of 50% thermoplastic starch (digested with 35% sorbitol and glycerol in a ratio of 1:1) and 50% polycaprolactone; fiber length 0.5 mm, water content of the fibers: 7%.

Temperature profile of compounder:

Zone 1, 60° C.; Zone 2, 180° C.; Zone 3, 180° C.; Zone 4, 120° C.; Zone 5, 120° C.; Zone 6, 120° C.; Zone 7, 120° C.; Zone 8, 150° C.

20 kg/hr of the polymer mixture are added in Zone 1. 1260 g/hr of ramie fibers are added in zone 4.

Extruder values:

Speed of rotation of extruder: 200 rpm

Torque: 50% of the maximum torque

Mass pressure (die): 4.0 bar

EXAMPLE 13

Polymer mixture according to Example 12.

Temperature profile of extruder:

Zone 1, 60° C.; Zone 2, 180° C.; Zone 3, 180° C.; Zone 4, 120° C.; Zone 5, 120° C.; Zone 6, 120° C.; Zone 7, 120° C.; Zone 8, 150° C.

20 kg/hr of a polymer mixture granulate are added in Zone 1. 2100 g/hr of ramie fibers are added in Zone 4. Granulation.

Extruder values:

Speed of rotation of extruder: 200 rpm

Torque: 50% of the maximum torque

Mass pressure (die): 4.0 bar

EXAMPLE 14

In contradistinction to the previously prepared polymer mixtures in which potato starch served as starch basis, completely digested corn thermoplastic starch with 35% sorbitol is used in the present example 14. Fiber length 0.5 mm; water content of the fibers: 7%.

Temperature profile of extruder:

Zone 1, 60° C.; Zone 2, 160° C.; Zone 3, 180° C.; Zone 4, 160° C.; Zone 5, 160° C.; Zone 6, 160° C.; Zone 7, 160° C.; Zone 8, 170° C.

Addition of 15 kg/hr of thermoplastic starch in Zone 1. In addition, 900 g/hr of ramie fibers are added in Zone 4, and 1500 g/hr of completely digested thermoplastic starch and 400 g/hr of stearic acid in Zone 5.

Extruder values:

Speed of rotation of extruder: 200 rpm

Torque: 45% of the maximum torque

Mass pressure (die): 6.0 bar

EXAMPLE 15

Thermoplastic starch similar to Example 14; length of fiber 0.1 mm; water content of the fibers: 7%.

Temperature profile of extruder:

Zone 1, 60° C.; Zone 2, 160° C.; Zone 3, 180° C.; Zone 4, 160° C.; Zone 5, 160° C.; Zone 6, 160° C.; Zone 7, 160° C.; Zone 8, 170° C.

Addition of 15 kg/hr of thermoplastic starch in Zone 1. In Zone 4, in addition, 1800 g/hr of ramie fibers, and in Zone 5 1500 g/hr of thermoplastic starch and 400 g/hr of stearic acid.

Extruder values:

Speed of rotation of extruder: 200 rpm

Torque: 45% of the maximum torque

Mass pressure (die): 10 bar

EXAMPLE 16

Thermoplastic starch similar to Examples 14 and 15; length of fiber 1.0 mm; water content of the fibers: 18%.

Temperature profile of extruder:

Zone 1, 60° C.; Zone 2, 160° C.; Zone 3, 180° C.; Zone 4, 160° C.; Zone 5, 160° C.; Zone 6, 160° C.; Zone 7, 160° C.; Zone 8, 170° C.

In Zone 1, addition of 15 kg/hr of thermoplastic starch. In Zone 4, addition of 1800 g/hr of ramie fibers. In Zone 5, addition of 3000 g/hr of thermoplastic starch and 400 g/hr of stearic acid. Granulation.

Extruder values:

Speed of rotation of extruder: 200 rpm

Torque: 50% of the maximum torque

Mass pressure (die): 6.0 bar

EXAMPLE 17

Pure polycaprolactone; length of fiber 1.0 mm; water content of the fibers: 18%.

Temperature profile of compounder:

Zone 1, 30° C.; Zone 2, 150° C.; Zone 3, 150° C.; Zone 4, 80° C.; Zone 5, 80° C.; Zone 6, 80° C.; Zone 7, 80° C.; Zone 8, 80° C.

In Zone 1, addition of 15 kg/hr of polycaprolactone. In Zone 2, addition of 1800 g/hr of ramie fibers, in Zone 5 addition of 5 kg/hr of polycaprolactone.

Extruder values:

Speed of rotation of extruder: 125 rpm

Torque: 45% of the maximum torque

Mass pressure (die): 5.0 bar

EXAMPLE 18

Digested corn thermoplastic starch with 32% sorbitol; length of fiber: 0.5 mm; water content of the fibers: 18%.

Temperature profile of compounder:

Zone 1, 60° C.; Zone 2, 180° C.; Zone 3, 180° C.; Zone 4, 180° C.; Zone 5, 180° C.; Zone 6, 180° C.; Zone 7, 200° C.; Zone 8, 200° C.

In Zone 1, addition of 25 kg/hr of thermoplastic starch. In Zone 4, addition of 1830 g/hr of ramie fibers; in Zone 5 addition of 4 kg/hr of thermoplastic starch. In this experiment, foaming was effected directly after the addition of the fibers within the same process.

Extruder values:

Speed of rotation of extruder: 100 rpm

Torque: 70–80% of the maximum torque

Mass pressure (die): 50 bar

EXAMPLE 19

The production was effected now, in contradistinction to the examples indicated above, on a Buss Ko-Kneader (46 mm screw diameter). As base there was used starch and plasticizer (35% sorbitol); length of fiber: 0.5 mm; water content of the fibers: 7%.

Temperature profile in the Buss kneader:

Zone 0, 90° C.; Zone 1, 90° C.; Zone 2, 130° C.; Zone 3, 150° C.; Zone 4, 150° C.

The Buss kneader has 4 heating zones (Zones 1–4); Zone 0 corresponds here to the heatable screw.

The starch was premixed here with 2.5% ramie fibers (referred to the final product TPS=starch+sorbitol). 13.5 kg/hr starch/fiber mixture and 7 kg/hr sorbitol were added together in Zone 1. This was followed by the plasticizing and then cold granulation.

Kneader values:

Kneader speed of rotation: 200 rpm

The specific power consumption is 300 Watt hours/kg

EXAMPLE 20

The production was effected with a twin-shaft screw kneader ZSK 40 of the firm of Werner & Pfleiderer of Stuttgart.

As basis, there was used a thermoplastic starch containing portions of polycaprolactone. As fiber material sisal fibers of an average length of 0.08 mm were used. The two components were added in Zone 1, namely 8 kg/hr of thermoplastic starch and 800 g/hr of sisal fibers. This was followed by extrusion-granulation.

Temperature profile in the kneader:

Zone 1, 30° C.; Zone 2, 160° C.; Zone 3, 160° C.; Zone 4, 140° C.; Zone 5, 130° C.; Zone 6, 130° C.; Zone 7, 130° C.

Speed of rotation: 100 rpm

Torque: 35% of the maximum torque

Mass pressure: 10 bar

Test Series 1:

In this test series, ramie fibers of a length of 4 mm were admixed in different percentages in a thermoplastic starch in a Brabender laboratory kneader, the starch containing 35% sorbitol.

TABLE 1

| Percentage of Fiber (in wt. %) | Starting Material | 9 | 17 | 23 | 29 |
|---|---|---|---|---|---|
| Relative tensile strength (referred to starting material) | 1 | 1.8 | 2.8 | 3.2 | 3.7 |
| Relative elongation upon rupture (referred to starting material) | 1 | 1.3 | 1.5 | 1.7 | 2 |

Test Series 2:

Ramie fibers were again admixed into the thermoplastic starch containing 35% sorbitol on a twin-shaft extruder. Fibers having a length of 0.5 mm were added in percentages of 7.5% and 13%.

TABLE 2

|  | Starting Material (pure TPS) | 7.5 wt. % Fibers | 13 wt. % Fibers |
|---|---|---|---|
| Tensile strength (N/mm$^2$) | 20 | 29 | 42 |
| Elongation upon Rupture (%) | 1.6 | 2.3 | 3.5 |
| Modulus of elasticity (N/mm$^2$) | 1000 | 1000 | 800 |

The decrease in the modulus of elasticity in the case of 13% fibers and the unchanged value of the modulus of elasticity in the case of 7.5% fibers is again due to a slight degradation of the thermoplastic starch. To be sure, it was found that the degradation could be greatly reduced as compared with Test Series 1 already by the use of a twin-shaft extruder and improved manner of procedure. By suitable design of the machine and optimizing of the procedure, this can be substantially prevented.

A comparison of the values in Table 1 and Table 2, insofar as this is possible, shows that the increase in the relative tensile strength in Table 1 with an increase in the proportion of ramie fibers is greater than in Table 2. This effect is due, in particular, to the use of a longer fiber in Test Series 1.

The formulas and test conditions used in Examples 1 to 20 and Test Series 1 and 2, are merely examples which serve solely further to explain the invention or, for instance, the production conditions. Of course, it is possible to reinforce also other polymers or polymer mixtures as natural fibers, such as, for instance, sisal or ramie fibers. Of course, it is also possible to use other natural fibers such as, for instance cotton, jute, hemp, flax, linen, silk, abaca and/or mixtures thereof instead of sisal or ramie fibers. The basic concept of the invention is that a polymer or polymer mixture which in itself is biologically degradable is prevented from at least partially losing its biologically degradability by the admixing of a reinforcing agent. By admixing a natural fiber such as, for instance sisal or ramie fibers, a respectable reinforcing of the polymer or the mixture is obtained without impairing the biological degradability.

I claim:

1. A reinforced biologically degradable polymer, characterized by thermoplastic starch or a polymer mixture containing thermoplastic starch and at least one hydrophobic biologically degradable polymer, reinforced by natural fibers which are incorporated in the polymer and the polymer mixture furthermore contains a phase mediator for the molecular coupling of the starch phase with the hydrophobic polymer phase.

2. A reinforced polymer according to claim 1, characterized by the fact that the polymer is reinforced by a natural fiber which is at least one member selected from the group consisting of ramie, cotton, jute, hemp, sisal, flax, linen, silk and abaca.

3. A reinforced polymer, according to claim 1, characterized by the fact that the natural fiber is ramie fiber.

4. A reinforced polymer according to claim 1 containing 5–30 wt. % of natural fiber.

5. A reinforced polymer, according to claim 1, characterized by a polymer mixture containing thermoplastic starch and at least one of the following polymers:

cellulose having a degree of substitution of 2, aliphatic polyester, hydrophobic protein, and polyvinyl alcohol.

6. A reinforced polymer according to claim 1, characterized by a polymer mixture of thermoplastic starch and polycaprolactone reinforced with at least one member selected from the group consisting of remie and sisal fibers.

7. A reinforced polymer according to claim 1, characterized by the fact that the thermoplastic starch contains at least one plasticizer or swelling agent selected from the group consisting of: glycerol, sorbitol, pentaerythritol, trimethylol propane, a polyvinyl alcohol, another polyhydric alcohol, an ethoxylated polyalcohol, and mixtures thereof.

8. A process of producing a reinforced, biologically degradable polymer, characterized by the fact that thermoplastic starch or a polymer mixture containing thermoplastic starch and a hydrophobic biologically degradable polymer is mixed in a temperature range of 100°–200° C. with 5–30 wt. % of natural fibers selected from the group consisting of ramie, cotton, jute, hemp, sisal, flax, linen, silk, abaca and mixtures thereof, wherein said starch has a water content of less than 1% by weight.

9. A process according to claim 8, characterized by the fact that thermoplastic starch, containing 20–35 wt. %, based on the weight of the resulting mixture, of glycerol or sorbitol or a mixture thereof as plasticizer or plasticizing agent is mixed with 5–30 wt. %, based to the total weight of the reinforced polymer, of ramie or sisal fibers having a fiber length of 0.08 to 4 mm within a temperature range of 130° C. to 180° C.

10. A process according to claim 8, characterized by the fact of incorporating into the reinforced polymer, at least one additive selected from the group consisting of lubricant, plasticizer, filler, mold removal agent, flame-retarding additive and defoaming agent.

11. A reinforced polymer according to claim 5 in which said polymer is selected from the group consisting of cellulose ether, cellulose ester, cellulose co-ester, polycaprolactam, polyhydroxy-butyric acid, polyhydroxy-butyric acid/hydroxy-valeric acid copolymer, polylactic acid, zein and about 88% hydrolyzed polyvinyl acetate.

12. A reinforced polymer according to claim 11, containing 5–30 wt. % of natural fiber selected from the group consisting of ramie, cotton, jute, hemp, sisal, flax, linen, silk and abaca.

13. A reinforced polymer according to claim 12, in which the natural fiber is ramie or sisal.

* * * * *